(12) United States Patent
Gupta et al.

(10) Patent No.: US 12,032,566 B2
(45) Date of Patent: Jul. 9, 2024

(54) CLUSTERING SUGGESTIONS FOR PARTIAL QUERY AUTO-COMPLETION

(71) Applicant: Microsoft Technology Licensing, LLC, Redmond, WA (US)

(72) Inventors: Manish Gupta, Hyderabad (IN); Puneet Agrawal, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/833,180

(22) Filed: Jun. 6, 2022

(65) Prior Publication Data
US 2023/0394040 A1     Dec. 7, 2023

(51) Int. Cl.
  *G06F 16/242*    (2019.01)
  *G06F 16/2453*   (2019.01)
  *G06F 16/28*     (2019.01)
  *G06F 16/9032*   (2019.01)

(52) U.S. Cl.
  CPC ...... *G06F 16/2445* (2019.01); *G06F 16/2454* (2019.01); *G06F 16/285* (2019.01); *G06F 16/90324* (2019.01); *G06F 16/90328* (2019.01)

(58) Field of Classification Search
  CPC ............. G06F 16/2445; G06F 16/2454; G06F 16/285; G06F 16/3322
  See application file for complete search history.

(56) References Cited

U.S. PATENT DOCUMENTS

2009/0171929 A1* 7/2009 Jing .................... G06F 16/3322
                                                    707/999.005

* cited by examiner

*Primary Examiner* — William Spieler

(57) ABSTRACT

Aspects of the present disclosure relate to providing, based on a partial query string, a plurality of autosuggestions that are diverse in nature such that the user is more likely to see the preferred complete query terms and therefore more likely to select one of the preferred suggestions which will increase search efficiency. As described herein, such functionality relates to generating cluster groups of candidate suggestions, each cluster including sub-topics, then performing the search based on a selected cluster or sub-topic. To generate the cluster groups, systems and methods, as described herein, analyze the similarity between candidate suggestions as well as the popularity of generated sub-topics. The cluster groups and sub-topics may be displayed visually, and in certain embodiments the cluster groups are ordered vertically from top to bottom and aligned to the left side of the display, while sub-topics are ordered horizontally from left to right following the cluster label.

20 Claims, 10 Drawing Sheets

CLUSTERING SUGGESTIONS FOR PARTIAL QUERY AUTO-COMPLETION

BACKGROUND

The use of network connected search features has become common in modern life. Search functionality may be enhanced by autosuggest features that provide suggested complete query terms based on partial text entries in the search field. It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to providing, based on a partial query string, a plurality of autosuggestions that are diverse in nature such that the user is more likely to see the preferred complete query terms and therefore more likely to select one of the preferred suggestions which will increase search efficiency. As described herein, such functionality relates to generating cluster groups of candidate suggestions, each cluster including sub-topics, then performing the search based on a selected cluster or sub-topic. To generate the cluster groups, systems and methods, as described herein, analyze the similarity between candidate suggestions as well as the popularity of generated sub-topics. The cluster groups and sub-topics may be displayed visually, and in certain embodiments the cluster groups are ordered vertically from top to bottom and aligned to the left side of the display, while sub-topics are ordered horizontally from left to right following the cluster label. By using cluster groups, the volume of displayed suggestions may be increased while diversifying the displayed suggestions. Also, in some embodiments, the suggestions presented to the user in a hierarchical arrangement manner to further improve efficiency.

As such, aspects of the present disclosure relate to systems and methods capable of receiving a partial query string; generating one or more candidate suggestions based on the partial query string; clustering the one or more candidate suggestions by similarity; displaying one or more cluster groups comprising a cluster label and one or more sub-topics; receiving a selection of a cluster label or sub-topic; performing a search with the selected cluster label or sub-topic as the complete query term; returning the results of the search; and causing the display of the search results. The partial query string may be one or more characters and where the one or more candidate suggestions relate to complete query terms based on the characters of the partial query string. Each cluster group may comprise a group of candidate suggestions, that are similar to each other based on a similarity score and wherein each displayed cluster groups and the sub-topics are selectable by the user to complete a search query.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

Figure 1:
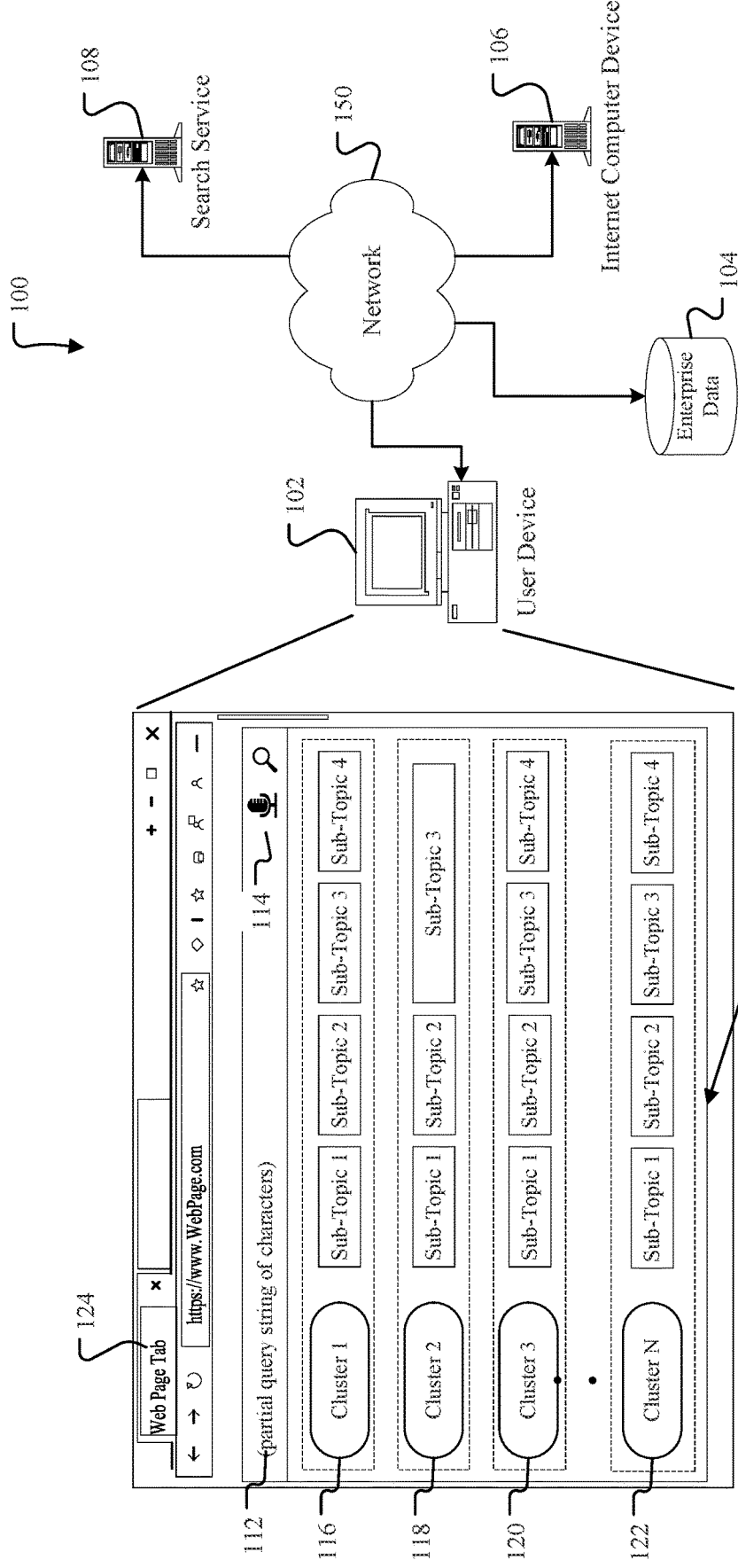
FIG. 1 illustrates an exemplary environment for providing search suggestions using cluster groups with sub-topics based on a partial query string, according to aspects described herein.

In the following detailed description, references are made to the accompanying drawings that form a part hereof, and in which are shown by way of illustrations, specific embodiments or examples. Aspects of the descriptions, drawings, etc. may be combined, while other aspects may be utilized, and structural changes may be made without departing from the present disclosure. Embodiments may be practiced as methods, systems or devices. Accordingly, embodiments may take the form of a hardware implementation, a software implementation, or an implementation combining software and hardware aspects. The following detailed description is therefore not to be taken in a limiting sense, and the scope of the present disclosure is defined by the appended claims and their equivalents.

Problems with prior systems relate to the suggestions may be ordered merely through share semantic similarity as the top ranked suggestions overall regardless of user search intent. Indeed, the small number of suggestions presented and limited diversity among the suggestions is a drawback that may limit the usefulness of the autosuggest feature. Ultimately, such deficiencies may encourage users to ignore the autosuggestions rather than utilizing them which leads to decreased search efficiency. Thus, the small number of suggestions presented and limited diversity among the suggestions is a drawback that may limit the usefulness of the autosuggest feature.

Ultimately, such deficiencies may encourage users to ignore the autosuggestions rather than utilizing them which leads to decreased search efficiency. This creates the problem where users ignore the provided autosuggestions until more characters are entered in the partial query string such that more applicable autosuggestions are presented. In the worst case, autosuggestions may be ignored completely, and the full complete query term may be entered by the user. Both outcomes are not preferable as they increase the amount of overall search time which decreases search efficiency and user engagement. Further, prior to the technology provided herein, the space available in the search pane was not well utilized to present suggestions to the user, as discussed below. Using only a portion of the available space in the search pane may limit the number of suggestions presented as well as lessening the diversity of options available for user selection. Finally, the displayed suggestions may lack a clear hierarchy of relevance to the search query which may inhibit user engagement. Often, suggestions are displayed in a single vertical column with many of the suggestions sharing semantic similarity to a single topic, rather than a range of topics with common semantic prefixes.

To address these issues an autosuggest user interface is described herein where potential search suggestions based on a partial query string are grouped by similarity into meaningful cluster groups having sub-topics related to the cluster topic and each other. Once the clusters are grouped, the sub-topics and cluster groups may be ranked based on popularity scores and/or popularity factors. The ranked cluster groups and sub-topics may be displayed in a display area as selectable icons representing various query terms responsive to the partial query string. The available space in the search pane may be better utilized such that the total number of suggestions displayed to the user may increase as multiple horizontal rows are included to display cluster groups.

Clustering suggestions by similarity, ranking them by popularity, and displaying them together with sub-topics may provide several benefits. First, the visual display with cluster groups and sub-topics makes it easier for the user to quickly see the relevant suggestions related to their search intent. Second, the displayed cluster groups and sub-topics are more diverse because each cluster and the sub-topics within it may represent a different group of suggestions from another cluster. Third, cluster groups and suggestions may be ranked by popularity scores which may consider both global popularity as well as popularity directly related to the user. Finally, the display area for autosuggestions is better utilized to provide more suggestions to the user which increases search efficiency.

FIG. 1 illustrates an exemplary environment for providing search suggestions using cluster groups with sub-topics based on a partial query string or character, according to aspects described herein. As illustrated environment 100 comprises a user device 102, enterprise data store 104, Internet computer device 106, search service 108, network 150, visual display 110, search field 112, symbol operators 114, a web page tab 124, and a plurality of cluster groups 116, 118, 120, and 122. The environment 100 may have a user device 102, which communicates over network 150 with a search service 108. A visual display 110, displayed on the user device 102, may contain a search field 112 and/or symbol operators 114 (such as exemplary microphone and search operator) to facilitate user entry of a complete query term or partial query string of one or more characters.

In a typical use scenario, a user may be interacting with a visual display 110 within a web page tab 124 on a user device 102. The web page tab 124 may include a search field 112 where a user may enter a partial query string to request additional information on a certain topic from search service 108. The partial query string may be a search request precursor and an indication for search service 108 to provide search suggestions related to the partial query string entry. Search service 108 may provide suggestions of complete query terms related to the partial query string on visual display 110. The search service 108 may communicate with other Internet computer systems 106 to help satisfy the request from the user device 102. Additionally, in accordance with some embodiments, the user device 102 may have access to enterprise data in enterprise data store 104. The search and suggestion functionality described herein may involve a search of such enterprise data over a network, such as network 150 or a separate, proprietary network. Accordingly, content from enterprise data store 104 may be presented in visual display 110.

The suggestions may be received by user device 102 and rendered on visual display 110. In some instances, the suggestions may be displayed in one or more cluster groups, such as cluster groups 116 to 122, within the visual display 110. A cluster group, such as cluster group 116, may include a cluster label and a series of sub-topics related to the cluster label. The number of sub-topics presented may vary based on the length of the sub-topic names relative to the available size of the visual display. Cluster groups may be presented vertically and aligned to the left side of the visual display as shown in visual display 110. The number of cluster groups presented may vary to utilize the space available on visual display 110. In the present example, four cluster groups are shown from Cluster 1 in cluster group 116 to Cluster N in cluster group 122. In some instances, one or more of the cluster labels and/or sub-topics displayed may be selectable by the user as the complete query term. As will be appreciated by those skilled in the art, the alignment of clusters, the number clusters and sub-topics per cluster may be modified in other embodiments from what is shown in FIG. 1, yet still fall within the scope of the present disclosure.

In some instances, the partial query string may be modified (e.g., one or more additional character entered or deleted) in the search field 112. The modified partial query string may be communicated to search service 108 and the suggestions presented may be updated on the visual display 110. The updated suggestions may modify the presentation of the visual display 110 to show more or less cluster groups and/or sub-topics. Once the user selects a cluster label or sub-topic, the user device 102 may communicate the selection as the complete query term to the search service 108. The search service 108 may perform a search based on the complete query term and return the results to user device 102.

Figure 2A:
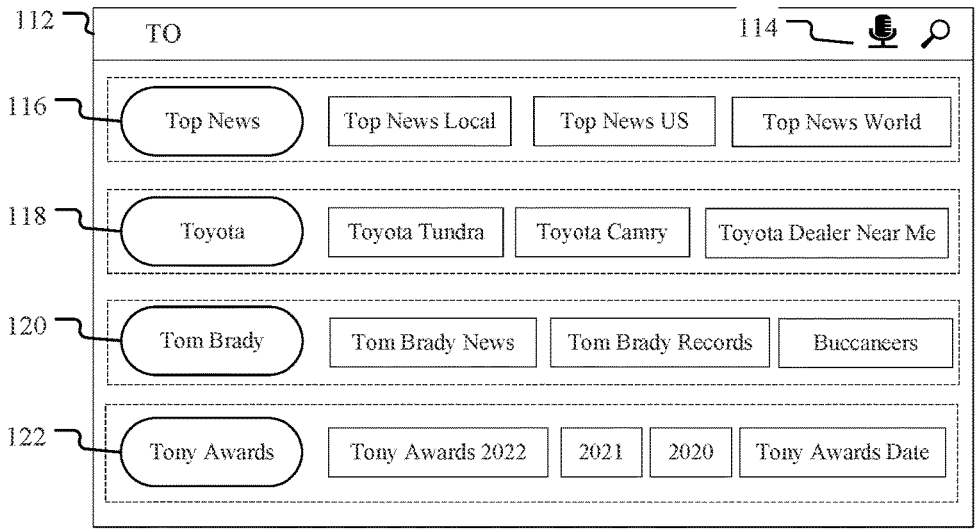
FIG. 2A illustrates a visual display showing cluster groups with sub-topics based on a partial query string having characters "TO".
Figure 2B:
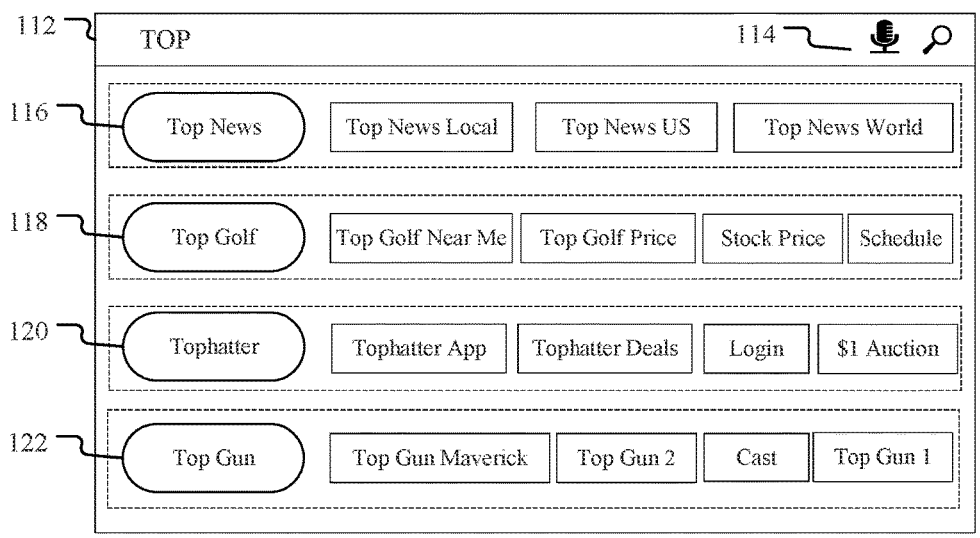
FIG. 2B illustrates the visual display of FIG. 2A, further illustrating the cluster groups with sub-topics based on a partial query string having characters "TOP".
Figure 2C:
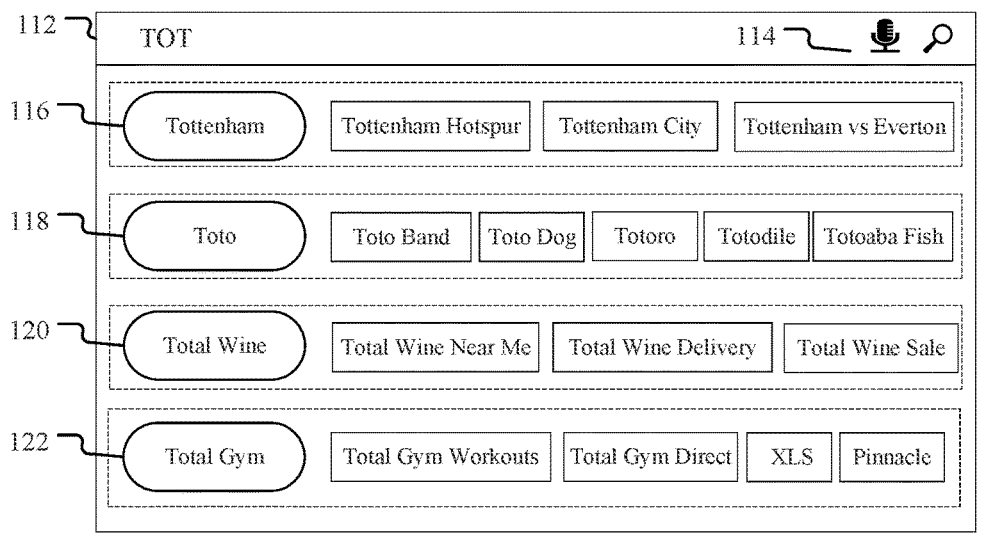
FIG. 2C illustrates the visual display of FIG. 2A, further illustrating the cluster groups with sub-topics based on a partial query string having characters "TOT".

FIGS. 2A, 2B, and 2C further illustrate many of the concepts described herein showing an exemplary visual display 110 on a user device and web page (not shown) with cluster groups and sub-topics. As illustrated visual display 110 comprises a search field 112, symbol operators 114, and a plurality of cluster groups 116, 118, 120, and 122. It should be appreciated that each of the cluster groups, cluster labels, and sub-topics function in a substantially similar way and that the description of one aspect of the visual display 110 may apply across all similar aspects.

FIG. 2A illustrates a visual display showing cluster groups with sub-topics based on a partial query string "TO". The user may enter partial query string "TO" into the search field 112. In some instances, the user input may be received as spoken word using the microphone symbol operator 114 and the user device microphone (not shown). A search service (e.g., search service 108) may return suggestions to the visual display 110. The returned suggestions may be comprised of four cluster groups 116-122 with corresponding sub-topics. The partial query string "TO" may generate the cluster group 116 with cluster label "Top News", cluster group 118 with cluster label "Toyota", cluster group 120 with cluster label "Tom Brady", and cluster group 122 with cluster label "Tony Awards".

Each of the cluster groups may have sub-topics listed within the cluster group. Continuing with the example of FIG. 2A, cluster group 116 contains sub-topics "Top News Local", "Top News US", and "Top News World". In cluster group 116 each of the sub-topics shares a similar prefix with both the cluster label and the other sub-topics, however that may not always be the case. Sub-topics may also be ranked and displayed based on semantics related to the partial query string, the cluster label, and/or both. For example, cluster group 120 includes the sub-topic "Buccaneers" which does not share a similar prefix to the partial query string or cluster label. However, "Buccaneers" is included in cluster group 116 because it is semantically related to the cluster label "Tom Brady" as one of the sports teams he has been a member of. In some instances, the cluster group, cluster label, and/or sub-topics may or may not be selectable. Additionally, in some instances when a cluster group, cluster label, and/or sub-topic is selected or hovered over the color of the cluster label or sub-topic may change to indicate that the user is interacting with it. For example, the user may hover over sub-topic "Tony Awards Date" in cluster group 122 and it may change icon and text color. Those skilled in the art will appreciate that there are many ways to select terms or text from certain web pages (e.g., using keystrokes, touch pads, touch screen interfaces, spoken input, etc.) which may be utilized in this instance.

FIG. 2B illustrates the visual display of FIG. 2A, further illustrating the cluster groups with sub-topics based on partial query string "TOP". In FIG. 2B, the user may have entered "P" as in the search field 112 to make the new partial query string of characters "TOP". The result is that new cluster groups and sub-topics will be displayed in visual display 110. In this instance, cluster group 116 does not change between FIGS. 2A and 2B because it remains the highest ranked cluster group sharing a similar prefix with the partial query string and semantic similarity. However, the remaining cluster groups 118-122 are different based on the additional partial query string character "P". As in FIG. 2A, the number of sub-topics within the cluster groups varies and may not share a similar prefix with either or both of the partial query string and cluster label. The visual display area of visual display 110 is utilized to display as many cluster groups and sub-topics as possible regardless of the exact number displayed.

FIG. 2C illustrates the visual display of FIG. 2A, further illustrating the cluster groups with sub-topics based on partial query string "TOT". In FIG. 2B, the user may have entered "P" as in the search field 112 to make the new partial query string "TOT". The result is that new cluster groups and sub-topics will be displayed in visual display 110. The user may add new characters in the search field as well as delete previously entered characters. Any new or deleted character may modify the cluster groups and sub-topics displayed within visual display 110. Based on the new partial query string "TOT" there is completely new set of cluster groups and sub-topics between FIGS. 2A and 2B with FIG. 2C.

As with FIGS. 2A and 2B, in FIG. 2C there is diversity of results among cluster labels and between sub-topics within the cluster label. Diversity may exist between cluster groups as well as between a cluster label and the sub-topics within the cluster group. For example, cluster group 116 now has cluster label "Tottenham" which is diverse from cluster group 118 with cluster label "Toto". Diversity also exists within cluster group 116 with sub-topic "Tottenham Hotspur" representing the premier league football club and sub-topic "Tottenham City" representing the town in north London. Similar diversity exists within cluster group 118 where each sub-topic shares a similar prefix "TOT" with the partial query string and the cluster label but semantic diversity from each sub-topic. The sub-topic "Toto Band" represents the band, the sub-topic "Toto Dog" represents the name of a dog, "Totoaba Fish" is a type of fish and so on. In this way, suggestions are presented that are diverse from each other yet semantically related to the partial query string as potential complete query terms. In any of the FIGS. 2A-2C the selection of a cluster label or sub-topic would be treated as the selection of a complete query term and communicated to the search service (e.g., search service 108) to perform the search.

The visual display 110 as described herein, includes a search field 112 where a partial query string of characters may be entered, deleted, and/or displayed. There may or may not be a border around the outside of the visual display 110. The search field 112 is presented at the top of the visual display 110, but it should be appreciated that the search field 112 could be positioned at many other positions within the visual display area based on the chosen design. The partial query string entered in search field 112, may be a single character or a combination of characters representing the initial portion of a complete query term. The characters entered may be letters, numbers, symbols (e.g., @, &, %, $, etc.), punctuation, text modifiers (e.g., capitalization, italics, bold, underline, etc.), website addresses, search commands (e.g., Or, Site:, Related:, Info:, etc.), search operators (e.g., Cache, Allintext, Intext, Around( ), etc.), natural language spoken word, audio files, video files and/or images. The characters may be entered into the search field 112 as text, spoken word, copied and pasted from another application, linked from another application, etc.

The total number of characters which may be entered in the search field 112 is variable. The search field 112 may expand or pop out to allow more characters if the complete query term or string and/or the partial query string exceeds a certain character threshold. Symbol operators 114 may be positioned at the top of the visual display 110, or elsewhere based on the design choice for visual display 110. There may only be one symbol operator 114 or there may be a plurality of symbol operators 114 as shown. The symbol operators 114 may be selectable allowing the user to quickly perform a certain action either before or after entering a partial query string or character. Symbols may link to other webpages, be an operator for initiating a search on the characters entered, be utilized to access other servers or applications on the user device (e.g., user device 102), and/or a variety of other actions. The visual display 110 may use a variety of color schemes and/or designs for the display itself as well as the search field 112, symbol operators 114, and/or cluster groups 116-122 to highlight each aspect and improve user interaction with the visual display 110.

In some instances, the cluster groups 116-122 may have a shape or border around each group individually and/or the groups collectively or both to show that the cluster label and sub-topics are related and in the same cluster group. In other instances, there may be no shape or border around a cluster group. As described in FIGS. 2A-2C, the cluster groups are aligned to the left side of the visual display and ranked vertically such that cluster group 116 is ranked higher than cluster group 118 and so on to cluster group 122. The cluster label, such as "Top News" in cluster group 116 in FIG. 2A, may be displayed within a shape, such as the exemplary oval, or it may be displayed as simply a name with no shape. In some instances, the cluster label may be selectable, in other instances it may not be.

The number of cluster groups to present in the visual display 110 may vary based on the size of the display area and the method chosen to identify cluster groups by cluster engine 336. For example, if KMeans was utilized to generate cluster groups then methods of choosing the number of cluster groups to display may include: the gap statistic method; selecting large sized cluster groups with the elbow method on a SCREE plot comparing the distribution of cluster group size versus cluster group rank; using session information to analyze co-occurring sessions in which queries appear, building a query co-occurrence graph where edges exist if co-occurrence probability is greater than a certain threshold, and setting the number of cluster groups selected as equivalent to the number of edges; and/or by other common means of selecting optimum display values from a dataset.

The number of sub-topics displayed may be a variable design choice based on similar considerations discussed with cluster groups. The number of sub-topics displayed per cluster group may vary from one cluster group to another within the visual display 110. For example, in FIG. 2A cluster group 116 has three sub-topics displayed whereas in cluster group 220 only three sub-topics are displayed. The sub-topics within the cluster group may also be ranked, with the most relevant sub-topic closest to the cluster label. For example, in cluster group 116 in FIG. 2A, "Top News Local" is the highest ranked sub-topic and is displayed closest to cluster label "Top News". The other sub-topics are displayed in ranked order from left to right such that the last sub-topic "Top News World" has the lowest rank. The sub-topics may be displayed within a shape and/or border, such as the exemplary rectangle, or they may be displayed as simply a name with no shape and/or border.

It should be appreciated that the exemplary display 110 is presented as an example of one method to present a visual display, from the myriad options available. One example of an alternative visual display 110 format may be a vertical listing of cluster groups with the cluster label on the right side with cluster groups ranked top to bottom, with sub-topics listed horizontally next to the cluster group and sub-topics ranked right to left. Another example may be a horizontal listing of cluster groups ranked left to right, with sub-topics listed vertically beneath each cluster group with sub-topics ranked top to bottom. A further example may be a visual display as a bubble graph with the cluster group being a larger bubble and sub-topics contained within the cluster group bubble. In this instance higher ranked cluster groups and sub-topics may have a larger bubble size, color, etc., to indicate responsiveness to the partial query string. It should be appreciated that the exemplary displays are not an exhaustive list of methods for displaying the cluster groups and sub-topics or their ranking structure but are offered as examples of the myriad of options available.

Figure 3:
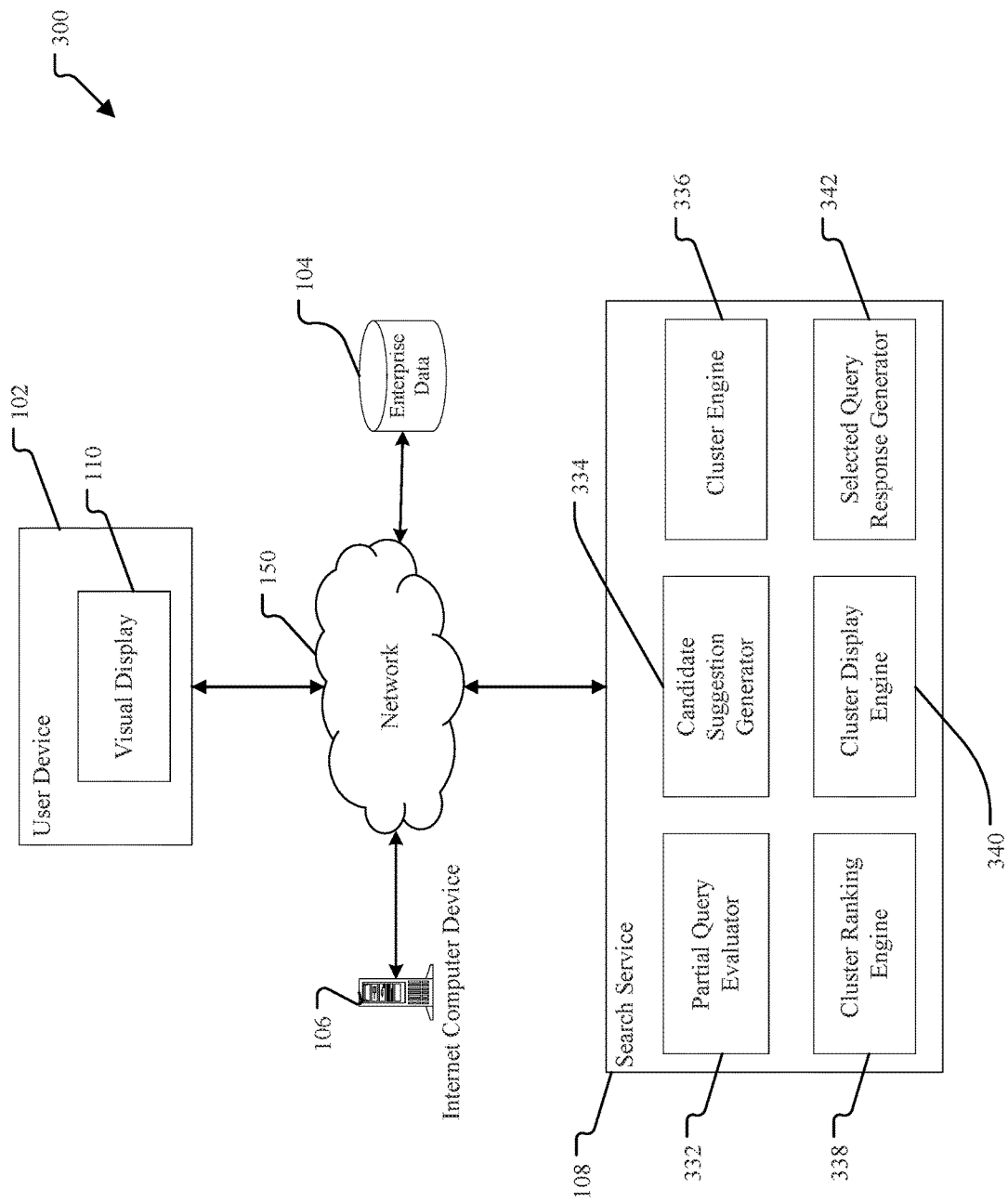
FIG. 3 is a diagram illustrating a system for providing search suggestions using cluster groups with sub-topics based on a partial query string, according to aspects described herein.

FIG. 3 is a diagram illustrating a system for providing search suggestions using cluster groups with sub-topics based on a partial query string, according to aspects described herein. As illustrated, system 300 comprises a user device 102, visual display 110, Internet computer device 106, enterprise data store 104, search service 108, and network 150. In examples, user device 102 and search service 108 communicate via network 150, which may comprise a local area network, a wireless network, or the Internet, or any combination thereof, among other examples.

According to aspects described herein, when a user (not shown) begins a search process by entering characters, a background process communicates with search service 108 to receive suggestions of a possible complete query term for display to the user on visual display 110. The suggestions may include a plurality of cluster groups, each having a cluster label and a plurality of sub-topics. Each cluster label and/or sub-topic may be independently selectable (once displayed) by the user to cause a complete query term to be executed and search results returned by search service 108.

User device 102 may be any device that can receive, process, modify, and communicate content on the network 150. Examples of a user device include a desktop computer, laptop computer, tablet, and wireless device. In examples, the app 104 is an application on the user device 102 which displays content for use on the user device 102 and communication across the network 150. In instances, app 104 may include a search feature which enables the user to search for content stored on the app 104 or stored in a different database, server, or application (not pictured) via network 150. App 104 may be a native application or a web-based application. App 104 may operate substantially locally to computing device 104 or may operate according to a server/client paradigm in conjunction with one or more servers (not pictured).

Search service 108 may access the user device 102 via the network 150. Search service 108 receives a partial query string from the user device 102, uses the partial query string to create one or more cluster groups and sub-topics to return to the user. Upon receiving a search request corresponding to a complete query term, search service 108 may process the search request and return results for display on the visual display 110. Search service 108 is illustrated as comprising partial query evaluator 332, candidate suggestion generator 334, cluster engine 336, cluster ranking engine 338, cluster display engine 340, and selected query response generator 342.

The partial query evaluator 332, may receive a partial query string from the search field (e.g., search field 112) of the visual display (e.g., visual display 110) via the network 150. The partial query string may be a single character or a combination of characters representing the initial portion of a complete query term. The characters may be entered as text, spoken word, copied, and pasted from another application, linked from another application, etc. It should be appreciated that these lists are not exhaustive and that the type of characters possible and entry method encompass the full aspect of information that and entry methods that may be input into the search feature. The partial query evaluator 332 may be able to recognize characters from a variety of languages, both natural languages and computer coding languages. The partial query evaluator 332 receives updated partial query string results as additional characters are entered into the search field.

The partial query evaluator 332 may be used to initially evaluate the partial query string, having one or more characters to determine the semantic structure of the partial query as well as aspects of the partial query string to include in generating candidate suggestions and those to disregard. The initial evaluation may be for the purpose of identifying which characters entered in the search field (e.g., search field 112) represent the partial query string and which represent other information. The other information may be a search command, search operator, punctuation, or other information that does not relate to the partial query string and may not be valuable in generating candidate suggestions. The partial query evaluator 332 may be able to recognize that certain characters such as text modifiers, search commands, and search operators should be included in the partial query string. Alternatively, the partial query evaluator 332 may disregard certain characters such as text modifiers, search commands, and search operators by recognizing they function to modify the partial query string without being part of the partial query string itself. For example, a partial query string may be two characters from the English language "t" and "o" entered in the search field as "to." The exemplary characters "to" may be entered into the search field as individual text characters, spoken word "t" and "o", spoken word "to", and/or copied and pasted as "to", etc. If the text "to" was underlined when it was copied into the search field the receiver may recognize that the underline should not be included in the partial query string utilized by other system components. The characters entered in the search field as either the complete query term or partial query string may be letters, numbers, symbols (e.g., @, &, %, $, etc.), punctuation, text modifiers (e.g., capitalization, italics, bold, underline, etc.), website addresses, search commands (e.g., Or, Site:, Related:, Info:, etc.), search operators (e.g., Cache, Allintext, Intext, Around( ), etc.), natural language spoken word, audio files, video files and/or images.

In some instances, the partial query evaluator 332, may include contextual information with the partial query string, to be utilized by other components of the system. The contextual information may be received by the partial query evaluator 332 when it receives the partial query string initially or at a later point after receiving the partial query string. The contextual information pertains to data which may not be directly part of the partial query string, but which may provide helpful context to be utilized throughout the system to create efficiency in producing cluster groups of candidate suggestions and results to the user. Contextual information may include a variety of information that generally falls into one of two categories, user contextual information and general contextual information. Examples of user contextual information may include user information (e.g., name, age, preferred languages, known languages, profile information, etc.), user search history, location where the user is conducting this search (e.g., home, office, geographic location, etc.), location where the user normally conducts searches (e.g., home country or region, home, office, etc.). General contextual information may include a broader category of information relating to the larger population of users, information, and events locally, regionally, and globally, natural language context for specific words or slangs across a population group, etc. Examples of general contextual information may include news and significant events occurring in a specific region or globally, historical information, important topics or interests of users based on geographic location, important topics or interests of users across all searches, relevant business information, etc. General contextual information may vary from user to user within a local geographic as well as across groups of users across regions. The contextual information may be included with the evaluated partial query string and utilized by other system components.

The candidate suggestion generator 334 may accept the evaluated partial query string from the partial query evaluator 332 and generate candidate suggestions based on the partial query string. In a broad sense, the candidate suggestions are an initial, unranked listing of possible complete query terms based on the one or more partial query characters of the partial query string. As more characters are included in the partial query string, the likelihood that the candidate suggestions will be relevant and responsive to the user intended complete query term increases. The candidate suggestions may be generated such that the initial characters of the candidate suggestion semantically match the one or more characters of the partial query string. For example, if the partial query string comprises the characters "to", examples of generated candidate suggestions could include "top news", "tom brady", "torrid", "top golf" and a myriad of other candidate suggestions. Alternatively, candidate suggestions may be generated such that they represent popular complete query terms relative to the intent expressed by the characters of the partial query string. For example, if the partial query string comprises the characters "jagu" a candidate suggestion may be returned recognizing "jaguar cars" which is semantically similar but may also include a candidate suggestion such as "jaguar cars price" as a popular complete query term relevant to the "jagu" partial query string.

The candidate suggestions generated based on the partial query string, may be unranked and unfiltered representing a general extent of possible complete query terms matching the partial query string. A high volume of candidate suggestions may be generated for each partial query character received. In instances, the candidate suggestion generator 334 may provide a batch of candidate suggestions for clustering, to the cluster engine 336, prior to generating all candidate suggestions or prior to sending all candidate suggestions.

After candidate suggestions are generated, the cluster engine 336 clusters the candidate suggestions into groups based on similarity between the candidate suggestions. A cluster group may be a group of candidate suggestions that are similar to each other based on their relation to the one or more partial query characters of the partial query string. The action of clustering may be performed as an unsupervised machine learning task using clustering algorithms to process the unlabeled candidate suggestions based on similarity scores within a cluster group. A similarity score may be a measure of similarity between candidate suggestions within a cluster group as well as with candidate suggestions not in the cluster group. Similarity scores for obtained candidate suggestions could be generated using various kinds of similarity measures such as semantic similarity using distributed embeddings (e.g., word2vec, BERT, GloVE, FastText, etc.), number of co-occurring sessions, number of commonly clicked webpages within a set threshold (e.g., top ranking within a geographic location or time period, etc.), similarity based on string edit distance, and/or other common density-based, distribution-based, centroid-based, or hierarchical-based methods.

Candidate suggestions that share similarity with each other, and thus have higher similarity scores, may be clustered into the same cluster group while suggestions that are less similar may be grouped into different cluster groups. The similarity score may be compared to a threshold value to generate the cluster group. In such instances, the cluster group may be generated where candidate suggestions with similarity scores higher than the threshold value will form a cluster group, while candidate suggestions whose similarity score is below the threshold may not be added to the cluster group. It is contemplated that some candidate suggestions may have similarity scores which place them in more than one cluster group. Likewise, there may be candidate suggestions whose similarity score does not place them in a cluster group. The effectiveness of the cluster engine 336, does not require complete categorization of each candidate suggestions into a cluster group, nor does it require discrete cluster groups. A cluster group may be static, or it may be updated on a periodic basis as new candidate suggestions are obtained and/or as the characters of the partial query string are modified. The more refined a cluster group becomes by increasing the threshold for the similarity score, it potentially becomes more useful as the candidate suggestions become more similar to each other. A variety of clustering algorithms may be utilized to create the cluster groups of candidate suggestions such as KMeans, DBscan, topic modeling, Gaussian Mixture Model, balance iterative reducing and clustering using hierarchies (BIRCH), affinity propagation clustering algorithm, mean-shift, ordering points to identify the clustering structure (OPTICS), agglomerative hierarchy, divisive hierarchical, spectral clustering, latent Dirichlet allocation, and/or probabilistic latent semantic analysis among others. It should be appreciated that the potential similarity measures and clustering algorithms described are not exhaustive lists and other methods may be utilized.

The similarity between candidate suggestions that generates a cluster group may generate a new tree structure with the cluster group functioning as a root node for candidate suggestions with a similarity score over the threshold value. In this instance, the similar candidate suggestions may be considered sub-topics of the cluster group. A sub-topic may be a candidate suggestion which, based on its similarity score, has been clustered with other candidate suggestions that exceed the similarity threshold. Within a cluster group, the sub-topics may share similar characters, or they may be completely diverse from each other yet related to the cluster label. It is likely sub-topics will not exactly match each other, such that the total characters of the displayed sub-topic label likely will differ across sub-topics. For example, the partial query string having characters "am" may have a cluster label "amd" with sub-topics "drivers" and "radeon software" that are responsive to the partial query string but different from each other. Additionally, the intent or relevance of the partial query string may also differ across cluster groups and/or sub-topics. For example, a partial query string having characters "to" may generate one cluster group "top gun" and another cluster group "top golfer" which are diverse from each other semantically. Thus, cluster groups and sub-topics may differ from each other based on total character composition, intent of the sub-topic as an entity, relevance of the sub-topics, and other possible points off differentiation.

As an example, the partial query string "to" may generate the resulting candidate suggestions "top news", "tom brady", "torrid", "top gun" among many others that are semantically similar with "to" and may include more or less characters to the listed candidate suggestions. Cluster engine 336 may assign similarity scores, as described above, for the candidate suggestions and then cluster them using one of the clustering algorithms and methods. Taking for example "top gun", at the cluster engine 336, all candidate suggestions semantically similar to "top gun" may be grouped into a single cluster group. As such, many sub-topics may be included as sub-topics under each cluster group as further options to identify the complete query term relevant to the partial query string. The sub-topics may share similarity with other sub-topics within the cluster group but may not share complete similarity with other sub-topics. Continuing with the "top gun" example, the cluster group "top gun" may include sub-topics "top gun 2", "top gun new movie", "top gun tom cruise", "top gun planes", "top gun rankings", "top gun range in" etc. Each of the sub-topics is similar to the cluster group "top gun" and to the other sub-topics but as a complete query term, semantically distinct from other sub-topics.

Bad clustering may occur when candidate suggestions appear to be very similar but are very different based on the context of the full character candidate suggestion. As an example, clustering based primarily on semantic similarity could cluster candidate suggestions to include "Walmart San Francisco", "Walmart Mountainview", "Walmart New York" in the same cluster group with "Walmart+a location", for the partial query string "wal". Such a cluster would likely not match the intent of the complete query term, producing ineffective cluster groups and sub-topics within the result. More specifically, the "Walmart+a location" is a bad cluster because usually the user will want to look up for Walmart close to them (i.e., in one location). Thus, a cluster with multiple "Walmarts" from various locations is most likely not useful to the user. Thus, one of the post processing rules is to remove clusters where the pattern is "some business name+a location". Given large lists of business names and locations, post processing rules may be written to identify and remove such bad cluster groups (or modify the same). Those skilled in the art may appreciate that other post-processing rules may be created and applied against the clusters and sub-topics to improve the effectiveness of the autosuggestions.

The cluster ranking engine 338, may rank the cluster groups and sub-topics within the cluster groups by assigning a popularity score to each sub-topic within a cluster group and then to the cluster group itself. The popularity score may be a measure of popularity of the sub-topic or cluster group based on a variety of factors. Popularity factors may be leveraged to focus the analysis on providing scores which account for both global popularity across all searches balanced against the specific intent of the user in making the search. The popularity factors that constitute the popularity score may differ between sub-topics and cluster groups or they may be similar to each other. Popularity factors utilized for both sub-topics and cluster groups include freshness, temporal burstiness, location affinity, and/or contextual information among others. An additional popularity factor for sub-topics may include average popularity of the sub-topic. An additional popularity factor for cluster groups may include visible size of the cluster group.

Freshness and temporal burstiness are like each other in that they measure the popularity of a cluster group or sub-topic by number of searches for the cluster group or sub-topic over a certain time period. But they vary from each other in the length of the measured time period. Freshness measures popularity over a medium time period, such as a few days, a week, or a few weeks. Thus, freshness captures average popularity of the cluster group or sub-topic within a medium term for the benefit of incorporating cluster groups and sub-topics that have a consistent popularity. The consistent popularity may be consistently low, high, or somewhere in between. Alternatively, temporal burstiness measures popularity over a very short time period, perhaps as little as a few minutes to a few days. The short time period may be utilized to capture events that while highly popular in the short term may not maintain their popularity over time. In aspects, some cluster groups or sub-topics may have consistently high freshness and temporal burstiness scores, consistently low scores for both, or a range of outcomes based on the nature of the cluster group or sub-topic. For example, a search for the sub-topic "week 1 football scores" may have initially very high temporal burstiness over a short time period immediately following the conclusion of football games, and relatively low freshness based on a medium time period that includes the week prior to the beginning of football games. As time progresses, the temporal burstiness may likely decline until it is minimal or beyond the short time period, while freshness may increase over the medium term of a few days before likely decreasing again as the next set of football games are played. The searches considered for each factor may be relative to the specific user or relative to the general population of users of the search feature. The higher the number of searches within the time period the higher the freshness and temporal burstiness factor scores.

Location affinity is a factor which prioritizes the user's specific location at the time of the search in scoring cluster groups and sub-topics. The importance of location affinity (as opposed to location which is included in contextual information), is that it increases the scores of cluster groups and sub-topics which might be ignored or ranked lower based on the user preferences and/or normal location settings. For example, a user who typically is located in New York City but happens to be traveling to London would likely prefer to receive cluster groups and sub-topics relevant restaurants in London rather than New York. As the system is making suggestions in anticipation of the complete query term, by factoring in location affinity, more relevant results may be generated for the partial query string "restaurants in" because the system may recognize the different location and prioritize it without requiring additional partial query string characters. Thus, the cluster groups and sub-topics will include restaurants relative to London more efficiently.

The contextual information pertains to data which may not be directly part of the partial query, cluster, or sub-topic but which may provide helpful context to be utilized to maximize efficiency in ranking cluster groups and sub-topics. The value of contextual information is that it recognizes the combination of important popularity factors may vary between users. By adding general context as well as specific context to the user more accurately ranked cluster groups and sub-topics may be generated. Contextual information may include a variety of information that generally falls into one of two categories, user contextual information and general contextual information.

User contextual information are those data points pertaining specifically to the user, that describe the user. Examples of user contextual information may include user information (e.g., name, age, preferred languages, known languages, profile information, etc.), user search history, location where the user is conducting this search (e.g., home, office, geographic location, etc.), location where the user normally conducts searches (e.g., home country or region, home, office, etc.). General contextual information may include a broader category of information relating to the larger population of users; information, people and events locally, regionally, and globally; natural language context for specific words, colloquialisms, or slangs across a population group, etc. Examples of general contextual information may include news and significant events occurring in a specific location or globally, historical information, important topics or interests of users based on geographic location, important topics or interests of users across all searches, relevant business information, etc. General contextual information may vary from user to user within a local geographic as well as across groups of users across regions. For example, the election of a government representative in Italy to that countries legislative body, may be relevant to a user in Italy, but not in Germany based on their specific location even though the election of a new European Union President may be relevant to both users from a larger regional location perspective.

For sub-topics specifically, average popularity may be a measure of the number of searches for a sub-topic compared against all sub-topics within the cluster. The number of searches may be based on the searches of general users of the search feature over a certain time period. In this instance the time period is variable based on the design choices made for the cluster ranking engine 338. The average popularity factor increases in importance based on more users entering a similar or the same search in the search feature over a certain time period. Conversely, the popularity score may decrease if less users enter the same search. For example, if 100,000 users searched for "top gun 2" within the past week, "top gun 2" will likely have a higher average popularity score than a sub-topic with only 50,000 searches in the past week. The higher the average popularity score for the sub-topic the more highly ranked the sub-topic may be within the cluster.

For cluster groups specifically, visible size of the cluster group may be a measure of the average popularity of the sub-topics chosen to be displayed. As will be described in greater detail below, a certain number of sub-topics may be presented as selectable options horizontally listed following the cluster label. The number of sub-topics presented may be a variable design choice if there are many sub-topics for a cluster or it may be a function of only having a few sub-topics for one cluster and many for another. In either case, the popularity of suggestions chosen to be displayed in a cluster is averaged and becomes the visible size of the cluster. The greater the visible size of the cluster the more highly ranked it may be.

Generally, once a popularity score has been calculated for the sub-topics within a cluster, the cluster ranking engine 338 may rank the sub-topics within a cluster. Sub-topics may be ranked such that those with the highest popularity scores will be the highest ranked sub-topics within the cluster. After the sub-topics have been ranked it may be possible to determine the visible size of each cluster as described above. Once the visible size of the cluster is calculated the other popularity factors may be utilized to generate a popularity score for each cluster. The cluster groups may then be ranked, based on popularity score, such that cluster groups with the highest popularity score may be ranked in the highest positions. The rankings of cluster groups and sub-topics may be updated at regular intervals or may remain static based on the design choices for the system. One of the benefits of performing the ranking via two separate popularity scores, one of which (the cluster popularity score) is directly related to the first is that the rankings reflect the popularity of the clustered group rather than just the cluster or sub-topics individually. In this way, it may be less likely that important or relevant candidate suggestions are not included in the information displayed to the user as suggestions.

In another aspect, less popular cluster groups and/or sub-topics may not be highly ranked because while highly relevant to the intent of the partial query, they do not have high popularity scores. To address this aspect, the cluster ranking engine 338, may choose cluster groups and sub-topics such that they match the partial query, have a high popularity score, and have high similarity with each other. The implementation of this aspect may involve performing a traditional search on the autosuggest tree to retrieve a large set of candidate suggestions based on matching the partial query string of characters and high popularity score. Next, pairwise similarities may be calculated for each pair of candidate suggestions, starting with the most popular suggestion. The following sets of candidate suggestions are chosen such that they have a high popularity score and well connected to already chosen candidate suggestions with high similarity scores. The method may proceed until the candidate suggestions are processed and correlated to ensure that the final set of selected candidate suggestions which may become cluster groups and sub-topics are both popular as well as highly connected to each other.

The clustering display engine 140, may generate a display of ranked cluster groups and sub-topics which can be presented to the user based on the partial query string input. The primary purpose of the display is to is to present cluster groups and sub-topics in an organized manner while increasing the number of suggestions displayed. The benefit of increasing displayed suggestions is that it maximizes the usefulness of the display window, organizes the solutions in a manner which increases diversity of suggestions while minimizing cognitive load required by the user to process the information, and reduces the amount of time required to find the variety of cluster groups and sub-topics offered. The cluster groups and sub-topics may be presented in a variety of visual formats as discussed above with respect to FIG. 2.

In some instances, both the cluster labels and sub-topics may be selectable by the user. In other instances, only the cluster labels or only the sub-topics may be selectable by the user. The number of cluster groups to display is variable based on the size of the visual display area and the method chosen to identify cluster groups by cluster engine 336. For example, if KMeans was utilized to generate cluster groups then methods of choosing the number of cluster groups to display may include: the gap statistic method; selecting large sized cluster groups with the elbow method on a SCREE plot comparing the distribution of cluster size versus cluster rank; using session information to analyze co-occurring sessions in which queries appear, building a query co-occurrence graph where edges exist if co-occurrence probability is greater than a certain threshold, and setting the number of cluster groups selected as equivalent to the number of edges; and/or by other common means of selecting optimum display values from a dataset.

The number of sub-topics to display per cluster may be variable and selected, by the cluster display engine 340, based on the following considerations: ensuring a pleasing display to the user; presenting relevant sub-topics to the user absent random but highly ranked sub-topics; and/or limiting the number of suggestions based on popularity score such that less popular sub-topics may not be displayed to the user. One method may be to determine the total number of sub-topics which may be shown across all cluster groups based on the available display area. The number of sub-topics to display per cluster may then be calculated as this total number divided by the total cluster groups which will produce an equal number for all cluster groups and maximize total display area. Another method may be to define a threshold value for sub-topic's based on popularity score where the minimum threshold value ensures that only popular sub-topics are displayed. The threshold value may be set as either a static global threshold such that the popularity score must exceed a minimum popularity threshold based on all sub-topics generated on the search engine within a certain time period, or as a dynamic threshold directly related to a variable particular to the entity itself where the entity could be the user, the partial query, the cluster, and/or sub-topics within the cluster, etc. Additionally, some sub-topics may exist within multiple cluster groups that are selected for display. This is not preferable as it duplicates sub-topics and limits the diversity of displayed information. In such an instance, substring checks may be applied to the cluster groups and sub-topics to either remove one of the sub-topics from its cluster and replace it with the next highest ranked sub-topic, and/or remove both sub-topics from each cluster and display the sub-topic as its own cluster.

The cluster display engine 340, may determine the displayed name of a cluster groups and sub-topics. The names of the cluster groups and sub-topics may be a single word, a phrase, an acronym, a symbol, and/or any of the characters described previously. The name of a cluster may be selected utilizing a variety of methods including: setting the cluster name based on the highest ranked sub-topic within the cluster if the highest ranked sub-topic shares a common prefix with most of the suggestions within the cluster; searching on the search feature for "top 5 popular sub-topics within cluster" and using the title of the first search result as the cluster name; utilize machine learning to train a natural language generation model to take the top 5 sub-topics within the cluster as input to the model, then generating a cluster name based on the input; using words which occur in most of the highest ranked sub-topics to form the cluster name; and/or matching a common prefix of several sub-topics within the cluster with a standard entity list from a knowledge base to form the cluster name. It should be appreciated that the exemplary methods for choosing a cluster name are not an exhaustive list but are offered as examples of the myriad of options available.

Whatever method is utilized, the cluster name may be selected to maximize efficient user comprehension of the cluster and sub-topics within the cluster. As such post-processing context rules may be included in selecting the cluster name to ensure that the name chosen is one which many users would understand as the common reference name of the cluster. For example, if the highest-ranked sub-topic method is utilized and the highest ranked sub-topic is "Microsoft Corporation" context rules may be applied to name the cluster "Microsoft" as few users would reference the company as "Microsoft Corporation". Sub-topics within a cluster may be named and displayed to maximize information presented to the user irrespective of whether the sub-topic name exactly matches the partial query. As such, it is possible that the name of the sub-topic may be only a partial match or a complete non-match to the partial query string but included based on popularity score and ranking. Additionally, the number of sub-topics do not have to be consistent across cluster groups, such that one cluster may have more or less sub-topics listed than another cluster. This may occur to maximize information presented to the user, to make the information to the user more easily understandable (e.g., a long name for a topic may be required to make it meaningful), and/or based on design constraints associated with the display area (e.g., the next ranked sub-topic name may be too long to fit properly within the display area).

The selected query response generator 342, may process the search request once a cluster or sub-topic has been selected by the user as representative of the intended complete query term. The selected query response generator 342 may perform the search query based on the selected cluster or sub-topic as the complete query term forming the input for the search. The search method may be performed utilizing the search algorithm connected with the search feature of the application 104. The results of the search query may be returned to the selected query response generator 342 for processing and display to the user utilizing the applicable method associated with the search feature of the application 104. The returned results and displayed results may be substantially similar to each other or additional post-processing of the returned results may be performed to generate the display.

As will be appreciated, the various methods, devices, apps, nodes, features, etc., described with respect to FIG. 3 or any of the figures described herein, are not intended to limit the system to being performed by the particular apps and features described. Accordingly, additional configurations may be used to practice the methods and systems herein and/or features and apps described may be excluded without departing from the methods and systems disclosed herein.

Figure 4:
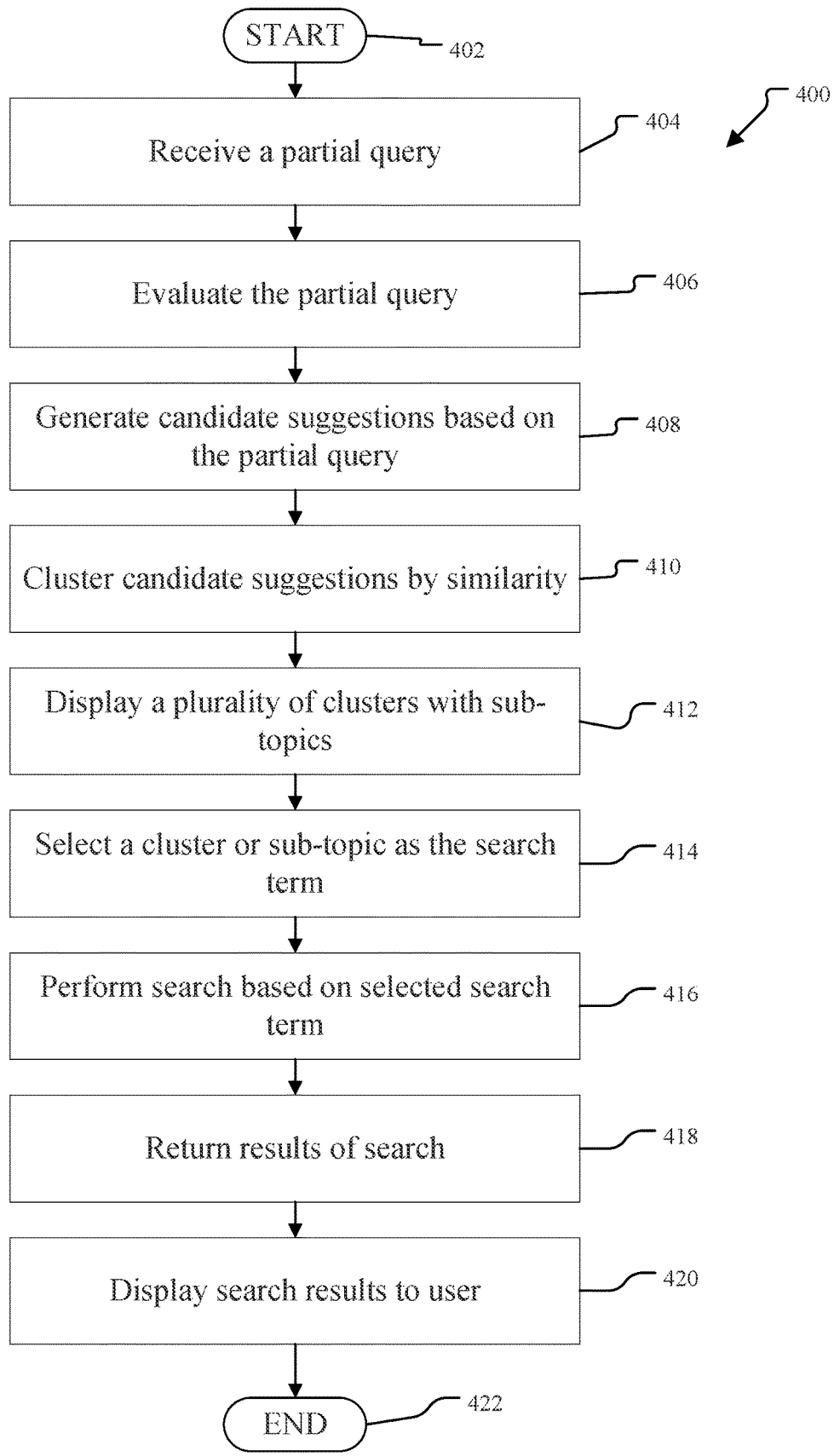
FIG. 4 is a block diagram illustrating a method for responding to a partial query string by generating cluster groups with sub-topics, then performing a search based on a selected cluster or sub-topic.

FIG. 4 is a block diagram illustrating a method for responding to a partial query string by generating cluster groups with sub-topics, then performing a search based on a selected cluster or sub-topic. A general order of the operations for the method 400 is shown in FIG. 4. Generally, the method 400 begins with start operation 402 and ends with end operation 422. The method 400 may include more or fewer steps or may arrange the order of the steps differently than those shown in FIG. 4. The method 400 can be executed as computer-executable instructions executed by a computer system and encoded or stored on a computer readable medium. Further, the method 400 can be performed by gates or circuits associated with a processor, an ASIC, an FPGA, a SOC or other hardware device. Hereinafter, the method 400 shall be explained with reference to the systems, components, devices, modules, software, data structures, data characteristic representations, signaling diagrams, methods, etc., described in conjunction with FIGS. 1, 3, 4, 5, 6, 7, 8, 9, and 10.

Following the start operation 402, the method 400 begins with the receive operation 404, which receives a partial query string from the search feature of the application. The partial query string may be a single character or a combination of characters representing the initial portion of a complete query term. A complete query term is the full character string that would be entered into the search field if autosuggestion was not available or not utilized. The characters entered may be letters, numbers, symbols (e.g., @, &, %, $, etc.), punctuation, text modifiers (e.g., capitalization, italics, bold, underline, etc.), website addresses, search commands (e.g., Or, Site:, Related:, Info:, etc.), search operators (e.g., Cache, Allintext, Intext, Around( ), etc.), natural language spoken word, audio files, video files and/or images. The characters may be entered into the search field as text, spoken word, copied and pasted from another application, linked from another application, etc.

Flow progresses to evaluate operation 406, where the partial query string is evaluated to determine the semantic structure of the partial query string as well as aspects of the partial query string to include in generating candidate suggestions and those to disregard. The initial evaluation may be for the purpose of identifying which characters entered in the search field represent the partial query string and which represent other information. The other information may be a search command, search operator, punctuation, or other information that does not relate to the partial query string and may not be valuable in generating candidate suggestions.

Flow progresses to generate operation 408, where candidate suggestions are generated based on the partial query string. In a broad sense, a candidate suggestion is a possible complete query term based on the characters of the partial query string. The more characters included in the partial query string the more likely it is that the candidate suggestion will be relevant and responsive to the user intended complete query term. The candidate suggestions may be generated such that the initial characters of the candidate suggestion semantically match the characters of the partial query string. Alternatively, candidate suggestions may be generated such that they represent popular complete query terms relative to the intent expressed by the characters of the partial query string.

Flow progresses to cluster operation 410, where candidate suggestions are clustered by similarity. A cluster may be a group of data points, in this instance candidate suggestions, that are similar to each other based on their relation to surrounding data points measured by a similarity score. The action of clustering may be performed as an unsupervised machine learning task using clustering algorithms to process the unlabeled candidate suggestion data set based on similarity scores within a cluster. A similarity score may be a measure of similarity between candidate suggestions within a cluster as well as with candidate suggestions not in the cluster. The similarity between candidate suggestions that generates a cluster may generate a new tree structure with the cluster functioning as a root node for candidate suggestions with a similarity score over the threshold value. In this instance, the similar candidate suggestions may be considered sub-topics of the cluster. The cluster groups and sub-topics may be ranked and ordered using similarity measures and clustering algorithms before being ranked and ordered based on a popularity score.

Flow progresses to display operation 412, which displays ranked cluster groups and sub-topics which can be presented to the user based on the partial query string input. The display presents cluster groups and sub-topics in an organized manner while increasing the number of suggestions displayed. The cluster groups and sub-topics may be presented in a variety of visual formats such as: a vertical listing of cluster groups ranked top to bottom, with sub-topics listed horizontally next to the cluster ranked left to right (see FIG. 2); a horizontal listing of cluster groups ranked left to right, with sub-topics listed vertically beneath each cluster ranked top to bottom; as a bubble graph with the cluster being a larger bubble and sub-topics contained within the cluster bubble, in this instance higher ranked cluster groups and sub-topics may have a larger bubble size, etc.

Flow progresses to receive operation 414, where a cluster or sub-topic is selected as the complete query term. In some aspects, both the cluster groups and sub-topics may be selectable as representative of the complete query term. In other aspects, one or the other of the cluster groups or sub-topics may be selectable.

Flow progresses to perform operation 416, where the search is performed based on the selected cluster or sub-topic as the complete query term. The search function may perform the search based on the selected cluster or sub-topic as the complete query term forming the input for the search. The search method may be performed utilizing the search algorithm connected with the search feature of the application.

Flow progresses to return operation 418, where the results of the search are returned. The results of the complete query term may be returned for processing by a search service (e.g., search service 108). The search service may communicate with other Internet computer devices (e.g., Internet computer device 106) and/or enterprise data stores (e.g., enterprise data store 104) to generate search results.

Flow progresses to display operation 420, where the returned results are displayed to the user. The results may be displayed utilizing the applicable method associated with the search feature. The returned results and displayed results may be substantially similar to each other or additional post-processing of the returned results may be performed to generate the display results. The method operation ends with the end operation 422.

Figure 5:
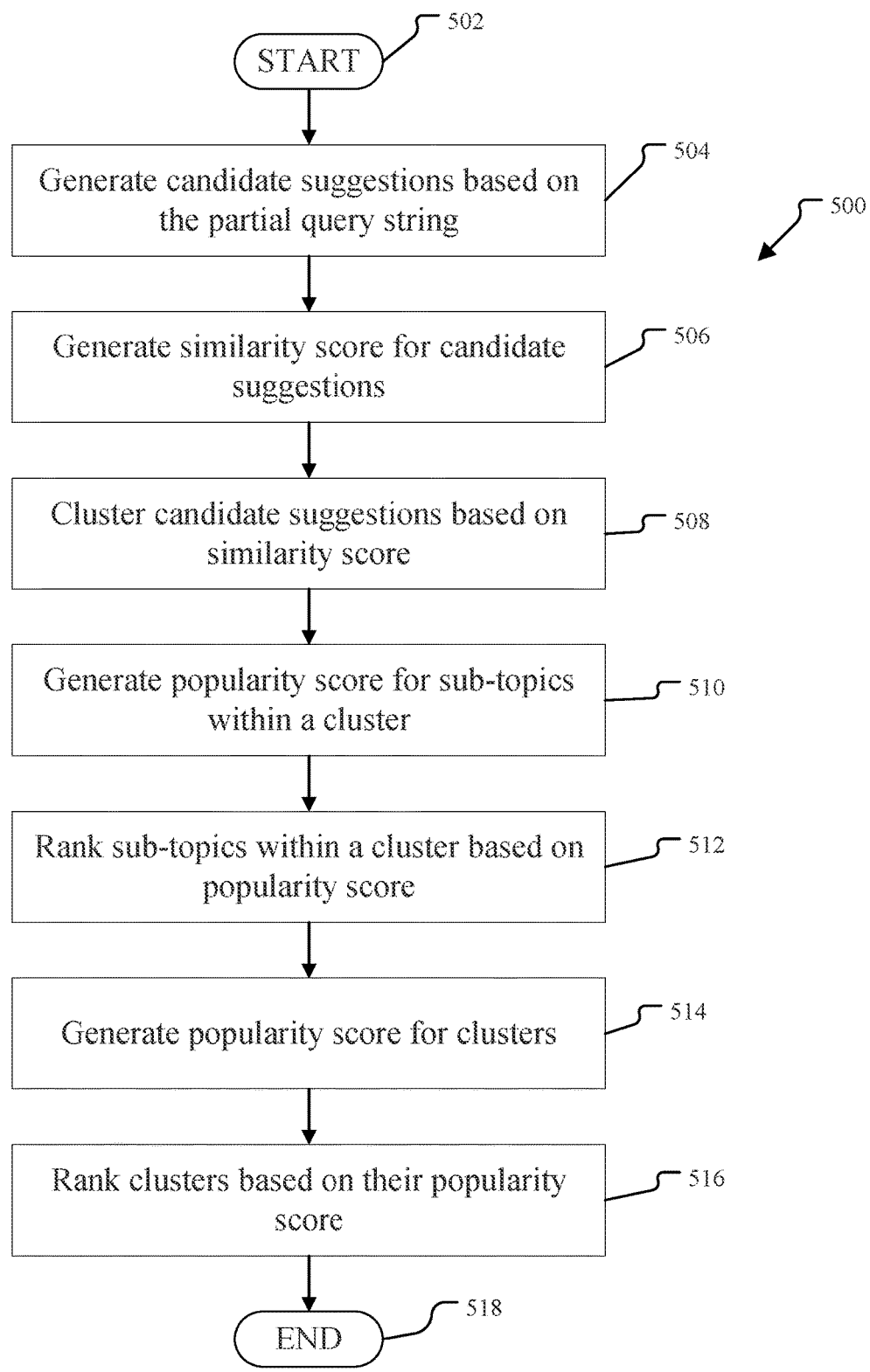
FIG. 5 is a block diagram illustrating a method for clustering candidate suggestions by similarity.

FIG. 5 is a block diagram illustrating a method for clustering candidate suggestions by similarity. A general order of the operations for the method 500 is shown in FIG. 5. Generally, the method 500 begins with start operation 502 and ends with end operation 518. The method 500 may include more or fewer steps or may arrange the order of the steps differently than those shown in FIG. 5. The method 500 can be executed as computer-executable instructions executed by a computer system and encoded or stored on a computer readable medium. Further, the method 300 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1, 2, 3, 4, 5, 6, 7, 8, 9, and 10.

Following the start operation 502, the method 500 begins with the generate operation 504, where candidate suggestions are generated based on the partial query. In a broad sense, a candidate suggestion is a possible complete query term based on the characters of the partial query string. The more characters included in the partial query string the more likely it is that the candidate suggestion will be relevant and responsive to the user intended complete query term. The candidate suggestions may be generated such that the initial characters of the candidate suggestion semantically match the characters of the partial query string. Alternatively, candidate suggestions may be generated such that they represent popular complete query terms relative to the intent expressed by the characters of the partial query string.

Flow progresses to generate operation 506, where similarity scores are generated for candidate suggestions. A similarity score may be a measure of similarity between candidate suggestions within a cluster as well as with candidate suggestions not in the cluster. Similarity scores for obtained candidate suggestions could be generated using various kinds of similarity measures such as semantic similarity using distributed embeddings (e.g., word2vec, BERT, GloVE, FastText, etc.), number of co-occurring sessions, number of commonly clicked webpages within a set threshold (e.g., top ranking within a geographic location or time period, etc.), similarity based on string edit distance, and/or other common density-based, distribution-based, centroid-based, or hierarchical-based methods.

Flow progresses to cluster operation 508, where candidate suggestions are clustered based on similarity score. A cluster may be a group of data points, in this instance candidate suggestions, that are similar to each other based on their relation to surrounding data points. Each cluster may include similar candidate suggestions which may be considered sub-topics of the cluster. The action of clustering may be performed as an unsupervised machine learning task using clustering algorithms to process the unlabeled candidate suggestion data set based on similarity scores within a cluster. The similarity score may be compared to a threshold value to generate the cluster. A variety of clustering algorithms may be utilized to create the cluster groups of candidate suggestions such as KMeans, DBscan, topic modeling, Gaussian Mixture Model, balance iterative reducing and clustering using hierarchies (BIRCH), affinity propagation clustering algorithm, mean-shift, ordering points to identify the clustering structure (OPTICS), agglomerative hierarchy, divisive hierarchical, spectral clustering, latent Dirichlet allocation, and/or probabilistic latent semantic analysis among others.

Flow progresses to generate operation 510, where popularity scores are generated for sub-topics within a cluster. The popularity score may be a measure of popularity of the sub-topic based on a variety of factors. Popularity factors may be leveraged to focus the analysis on providing scores which account for both global popularity across all searches balanced against the specific intent of the user in making the search. Popularity factors utilized for sub-topics include freshness, temporal burstiness, location affinity, contextual information and/or average popularity.

Flow progresses to rank operation 512, where sub-topics within a cluster are ranked based on their popularity score. Sub-topics may be ranked such that those with the highest popularity scores will be the highest ranked sub-topics within the cluster. The rankings of sub-topics may be updated at regular intervals or may remain static based on the design choices for the method.

Flow progresses to generate operation 514, where popularity scores are generated for cluster groups. The popularity score may be a measure of popularity of the cluster based on a variety of factors. Popularity factors may be leveraged to focus the analysis on providing scores which account for both global popularity across all searches balanced against the specific intent of the user in making the search. Popularity factors utilized for cluster groups include freshness, temporal burstiness, location affinity, contextual information, and/or visible size of the cluster.

Flow progresses to rank operation 516, where cluster groups are ranked based on their popularity score. After the sub-topics have been ranked it may be possible to determine the visible size of each cluster. Once the visible size of the cluster is calculated the other popularity factors may be utilized to generate a popularity score for each cluster. The cluster groups may then be ranked, based on popularity score, such that cluster groups with the highest popularity score may be ranked in the highest positions. The rankings of cluster groups may be updated at regular intervals or may remain static based on the design choices for the method. The method operation ends with end operation 518.

Figure 6:
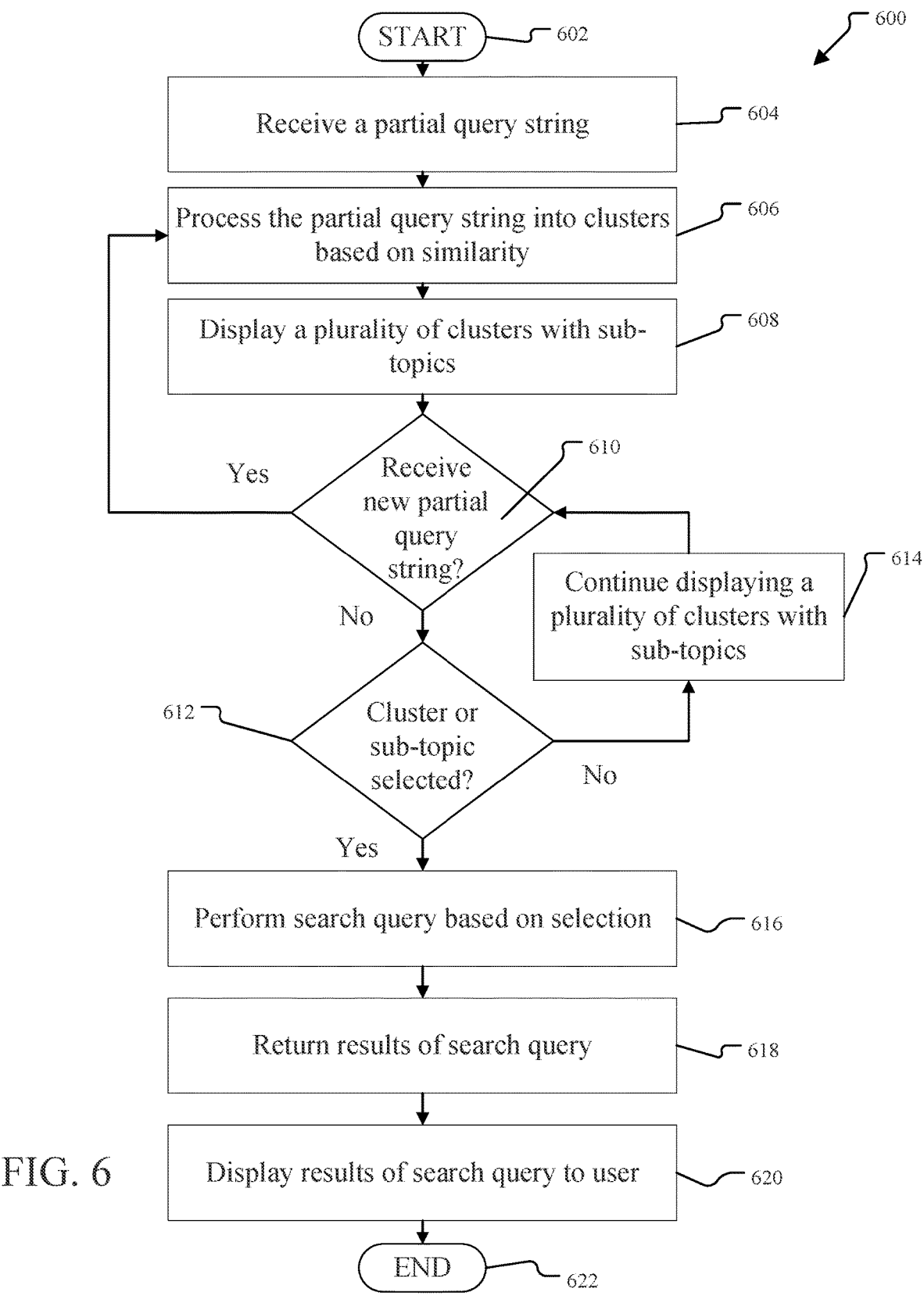
FIG. 6 is a block diagram illustrating a method for receiving multiple partial queries, providing suggestions as cluster groups and sub-topics, then performing a search based on a selected cluster or sub-topic.

FIG. 6 is a block diagram illustrating a method for receiving multiple partial queries, providing suggestions as cluster groups and sub-topics, then performing a search based on a selected cluster or sub-topic. A general order of the operations for the method 600 is shown in FIG. 6. Generally, the method 600 begins with start operation 602 and ends with end operation 622. The method 600 may include more or fewer steps or may arrange the order of the steps differently than those shown in FIG. 6. The method 600 can be executed as computer-executable instructions executed by a computer system and encoded or stored on a computer readable medium. Further, the method 600 can be performed by gates or circuits associated with a processor, an ASIC, an FPGA, a SOC or other hardware device. Hereinafter, the method 600 shall be explained with reference to the systems, components, devices, modules, software, data structures, data characteristic representations, signaling diagrams, methods, etc., described in conjunction with FIGS. 1, 2, 3, 5, 6, 7, 8, 9, and 10.

Following the start operation 602, the method 600 begins with the receive operation 404, which receives a partial query string from the search feature of the application. The partial query string may be a single character or a combination of characters representing the initial portion of a complete query term. The characters entered may be letters, numbers, symbols (e.g., @, &, %, $, etc.), punctuation, text modifiers (e.g., capitalization, italics, bold, underline, etc.), website addresses, search commands (e.g., Or, Site:, Related:, Info:, etc.), search operators (e.g., Cache, Allintext, Intext, Around( ), etc.), natural language spoken word, audio files, video files and/or images. The characters may be entered into the search field as text, spoken word, copied and pasted from another application, linked from another application, etc.

Flow progresses to process operation 606, where the partial query string is processed into cluster groups based on similarity. The partial query string will be evaluated, then candidate suggestions will be generated based on the partial query. A cluster may be a group of data points, in this instance candidate suggestions, that are similar to each other based on their relation to surrounding data points. The action of clustering may be performed as an unsupervised machine learning task using clustering algorithms to process the unlabeled candidate suggestion data set based on similarity scores within a cluster. A similarity score may be a measure of similarity between candidate suggestions within a cluster as well as with candidate suggestions not in the cluster. The similarity between candidate suggestions that generates a cluster may generate a new tree structure with the cluster functioning as a root node for candidate suggestions with a similarity score over the threshold value. In this instance, the similar candidate suggestions may be considered sub-topics of the cluster. The cluster groups and sub-topics may be ranked and ordered using similarity measures and clustering algorithms before being ranked and ordered based on a popularity score.

Flow progresses to display operation 608, where a plurality of cluster groups with sub-topics may be displayed. The display presents cluster groups and sub-topics in an organized manner while increasing the number of suggestions displayed. The cluster groups and sub-topics may be presented in a variety of visual formats such as: a vertical listing of cluster groups ranked top to bottom, with sub-topics listed horizontally next to the cluster ranked left to right (see FIG. 2); a horizontal listing of cluster groups ranked left to right, with sub-topics listed vertically beneath each cluster ranked top to bottom; as a bubble graph with the cluster being a larger bubble and sub-topics contained within the cluster bubble, in this instance higher ranked cluster groups and sub-topics may have a larger bubble size, etc.

Flow progresses to decision operation 610, which determines if a new partial query string has been received. A new partial query string may include a new character or characters added to the previous partial query string, the removal of a character from the previous partial query string, or it could be an entirely new set of characters replacing the previous partial query string. For example, if the previous partial query string was "to" a new partial query string could take the forms "tom", "t" or "cat". If a new partial query string is received the result is to return the method to process operation 406 and process the new partial query string into cluster groups based on similarity as previously described. If a new partial query string is not received the result is to progress to decision operation 612.

Flow progresses to decision operation 612, which determine if a cluster or sub-topic was selected by the user on the display. In some aspects, both the cluster groups and sub-topics may be selectable as representative of the complete query term. In other aspects, one or the other of the cluster groups or sub-topics may be selectable. If a cluster or sub-topic was not selected the result is to progress to continue operation 614 and continue displaying the plurality of cluster groups with sub-topics. The flow from operation 610 to operation 614 functions as a loop once the initial partial query string is processed and displayed to maintain method performance and display while awaiting a user action, either entering a new partial query character to the partial query string or selecting a cluster or sub-topic. If a cluster or sub-topic is selected the result is to progress to perform operation 616.

Flow progresses to perform operation 616, where the search is performed based on the selected cluster or sub-topic as the complete query term. The search function may perform the search based on the selected cluster or sub-topic as the complete query term forming the input for the search. The search method may be performed utilizing the search algorithm connected with the search feature of the application.

Flow progresses to return operation 618, where the results of the search are returned. The results of the complete query term may be returned for processing by a search service (e.g., search service 108). The search service may communicate with other Internet computer devices (e.g., Internet computer device 106) and/or enterprise data stores (e.g., enterprise data store 104) to generate search results.

Flow progresses to display operation 620, where the returned results are displayed to the user. The results may be displayed utilizing the applicable method associated with the search feature. The returned results and displayed results may be substantially similar to each other or additional post-processing of the returned results may be performed to generate the display results. The method operation ends with the end operation 622.

Figure 7:
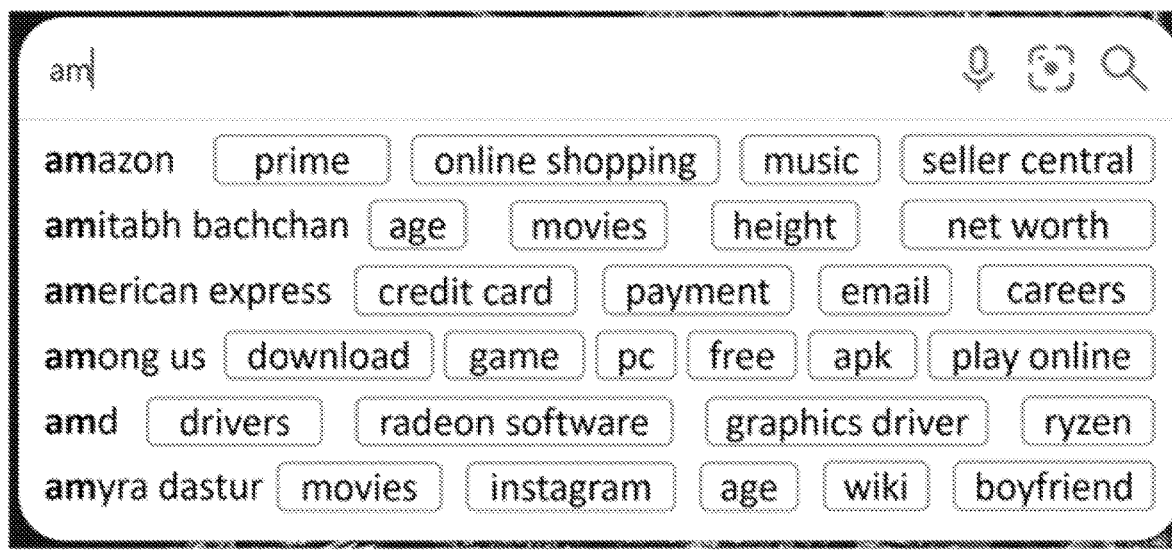
FIG. 7 is an example of a visual display with cluster groups and sub-topics.

FIG. 7 is an example of a visual display with cluster groups and sub-topics based on a partial query. The visual display of FIG. 7 includes a search field which accepts partial queries and presents cluster groups and sub-topics to the user in response. There are symbol icons placed in the upper right corner of the visual display. The cluster groups are ranked vertically and aligned to the left side of the display with sub-topics presented to the right of the cluster and ranked in order from right to left. The groups of cluster and sub-topics are in line with each other from left to right and then from top to bottom. There are symbol icons placed in the upper right corner of the visual display. The cluster group in the bottom right corner is the lowest ranked cluster and its related sub-topics. The display and color scheme chosen shows the cluster groups without a border, the letters that match the partial query string in the cluster are highlighted, the sub-topics are bordered by a green outline, the visual display has a black border. The display area presents the maximum amount of useful information, a total of twenty-seven sub-topics and six cluster groups. The diversity of information presented is high as there are no repeat cluster or sub-topic names. The information is presented in a clear and easily understood manner from left to right and top to bottom similar to the western European reading method.

Figure 8:
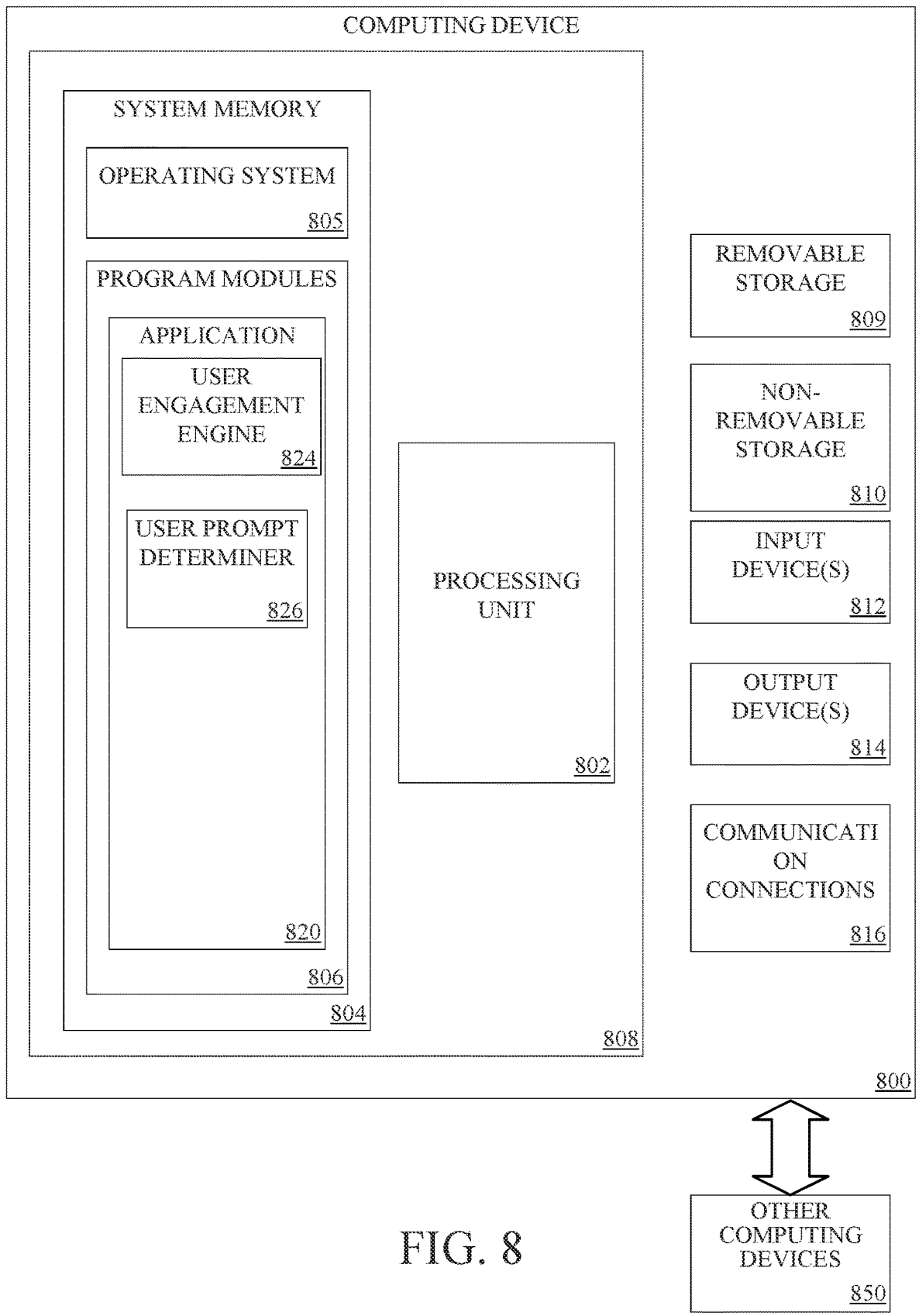
FIG. 8 is a block diagram illustrating example physical components of a computing device with which aspects of the disclosure may be practiced.

FIG. 8 is a block diagram illustrating example physical components of a computing device with which aspects of the disclosure may be practiced. is a block diagram illustrating physical components (e.g., hardware) of a computing device 800 with which aspects of the disclosure may be practiced. The computing device components described below may be suitable for the computing devices described above, including devices 104, as well as one or more devices discussed above with respect to FIG. 1. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories.

The system memory 804 may include an operating system 805 and one or more program modules 806 suitable for running software application 820, such as one or more components supported by the systems described herein. As examples, system memory 804 may store the visualization display generator 824 and knowledge graph generator 826. The operating system 805, for example, may be suitable for controlling the operation of the computing device 800.

Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., application 820) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media.

Computer storage media may include volatile and non-volatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
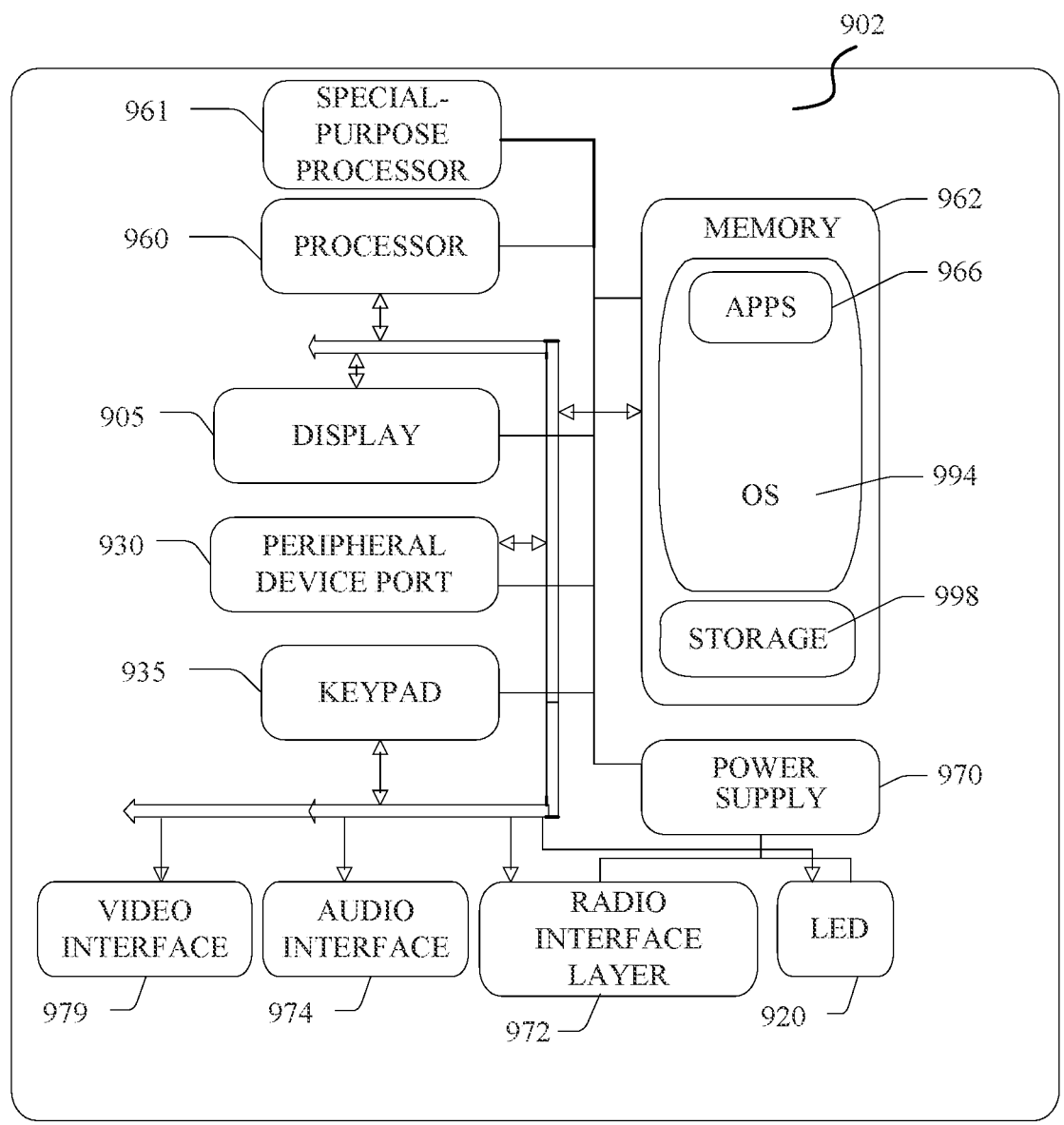
FIG. 9 is a simplified block diagrams of a mobile computing device with which aspects of the present disclosure may be practiced.

FIG. 9 is a block diagram illustrating the architecture of one aspect of a computing device. That is, a mobile computing device can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the computing device described herein.

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via the audio transducer 925. In the illustrated embodiment, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with embodiments of the present disclosure, the microphone may also serve as an audio sensor to facilitate control of notifications, as will be described below. The system 902 may further include a video interface 976 that enables an operation of an on-board camera 1530 to record still images, video stream, and the like.

A computing device implementing the system 902 may have additional features or functionality. For example, the computing device may also include additional data storage devices (removable and/or non-removable) such as, magnetic disks, optical disks, or tape. Such additional storage is illustrated in FIG. 9 by the non-volatile storage area 968.

Data/information generated or captured by the computing device and stored via the system 902 may be stored locally on the computing device, or the data may be stored on any number of storage media that may be accessed by the device via the radio interface layer 972 or via a wired connection between the computing device and a separate computing device associated with the computing device, for example, a server computer in a distributed computing network, such as the Internet. As should be appreciated such data/information may be accessed via the computing device via the radio interface layer 972 or via a distributed computing network. Similarly, such data/information may be readily transferred between computing devices for storage and use according to well-known data/information transfer and storage means, including electronic mail and collaborative data/information sharing systems.

Figure 10:
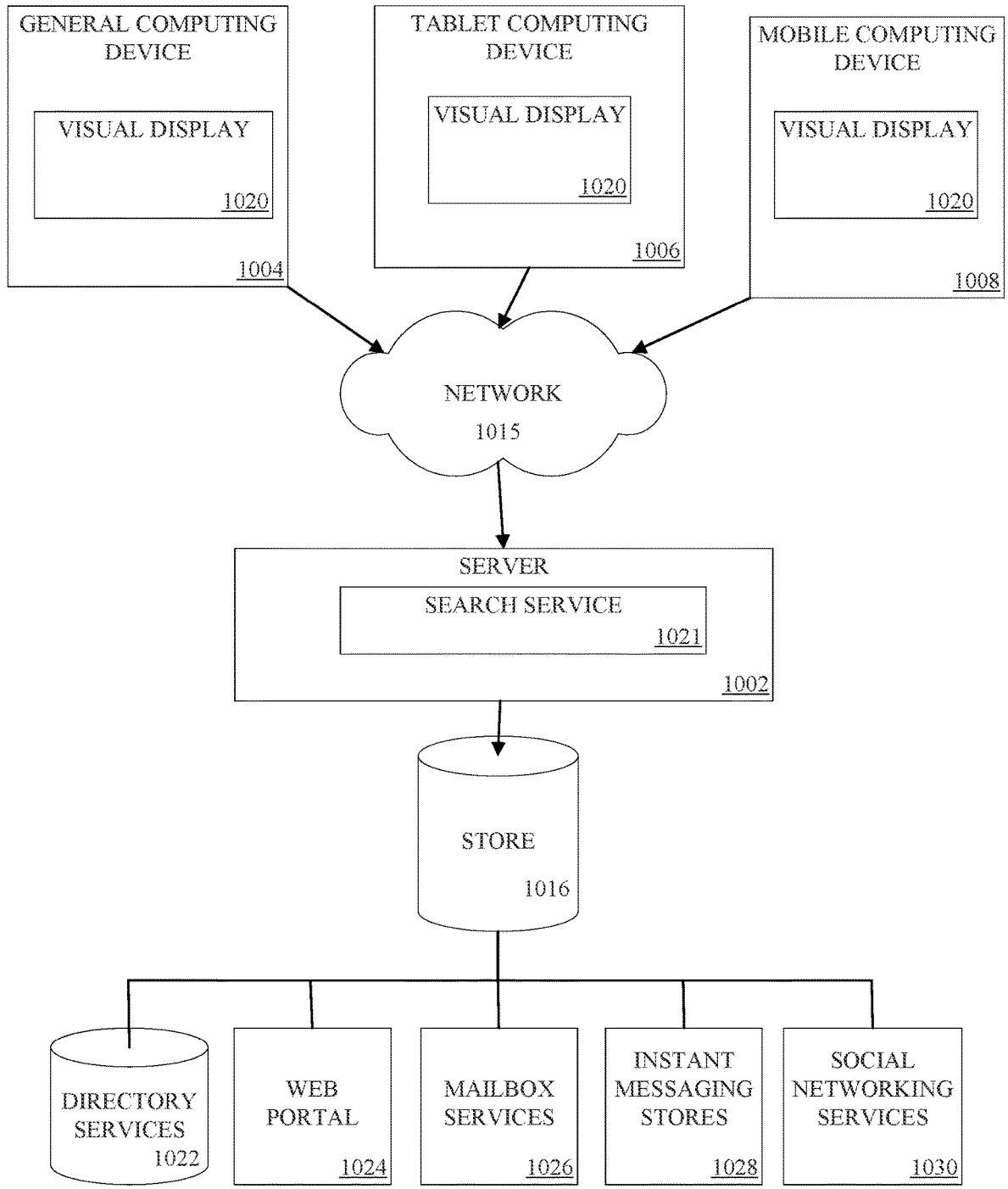
FIG. 10 is a simplified block diagram of a distributed computing system in which aspects of the present disclosure may be practiced.

FIG. 10 illustrates one aspect of the architecture of a system for processing data received at a computing system from a remote source, such as a personal computer 1004, tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking site 1030.

An app 1020 may be employed by a client that communicates with server device 1002, and/or cluster engine 1021 may be employed by server device 1002. The server device 1002 may provide data to and from a client computing device such as a personal computer 1004, a tablet computing device 1006 and/or a mobile computing device 1008 (e.g., a smart phone) through a network 1015. By way of example, the computer system described above may be embodied in a personal computer 1004, a tablet computing device 1006 and/or a mobile computing device 1008 (e.g., a smart phone). Any of these embodiments of the computing devices may obtain content from the store 1016, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, causes the system to perform a set of operations, the set of operations comprising:
      receiving one or more characters of a partial query string;

generating a first plurality of candidate suggestions, wherein each candidate suggestions comprises a complete query term based on the received characters;

clustering the first plurality of candidate suggestions into a plurality of cluster groups;

wherein each cluster group of the plurality of cluster groups functions as a root node for candidate suggestions with a similarity score comprising a measure of similarity between candidate suggestions over a threshold value;

causing the display of cluster groups and sub-topics, wherein causing the display further comprises:

selecting, from the plurality of cluster groups, a first number of cluster groups based on a popularity score assigned to each cluster groups;

determining, for each cluster group of the first number of cluster groups, a respective cluster label based on the complete query terms of candidate suggestions within the cluster group;

determining, for a first cluster group of the selected first number of cluster groups, sub-topics to display;

determining, for each sub-topic to display a name based on the complete query term of a respective candidate suggestion in the first cluster group; and presenting the first number of cluster groups and sub-topics in an organized manner, wherein the cluster labels of the first number of cluster groups are presented vertically ranked by the popularity score assigned to each respective cluster group; and wherein the names of the sub-topics are presented horizontally, next to the name of the first cluster group, ranked by a popularity score assigned to each respective candidate suggestion;

receiving a selection of a cluster label or sub-topic;

determining a complete query term from a candidate suggestion associated with the selection;

performing a search using the determined complete query term;

returning the results of the search; and causing the display of the search results.

2. The system of claim 1, wherein the first plurality of candidate suggestions comprises a single character or a combination of characters representing the initial portion of a complete query term.

3. The system of claim 1, wherein the first plurality of candidate suggestions comprise possible complete query terms based on the received characters.

4. The system of claim 1, wherein the cluster group comprises a group of candidate suggestions, that are similar to each other based on a similarity score.

5. The system of claim 4, wherein the sub-topics comprises the displayed candidate suggestions within the cluster group.

6. The system of claim 1, wherein displaying the plurality of cluster groups further comprises the plurality of cluster groups ordered vertically with sub-topics related to the cluster group displayed horizontally from left to right after a cluster label.

7. The system of claim 6, wherein the cluster groups and the sub-topics are selectable.

8. A method comprising:

generating a first plurality of candidate suggestions, wherein each candidate suggestions comprises a complete query term based on received characters;

generating a similarity score for the one or more candidate suggestions for complete query terms, wherein the complete query terms is related to the received characters;

clustering the first plurality of candidate suggestions into a plurality of cluster groups;

wherein each cluster group of the plurality of cluster groups functions as a root node for candidate suggestions with a similarity score comprising a measure of similarity between candidate suggestions over a threshold value;

generating a popularity score for sub-topics within the plurality of cluster groups;

ranking the sub-topics within the plurality of cluster groups;

generating a popularity score for each of the plurality of cluster groups; and ranking the plurality of cluster groups.

9. The method of claim 8, wherein the cluster group comprises a group of candidate suggestions, that are similar to each other based on a similarity score.

10. The method of claim 8, wherein a similarity score is a measure of similarity between the first plurality of candidate suggestions within a cluster as well as with the first plurality of candidate suggestions not in the cluster.

11. The method of claim 8, further comprising a plurality of sub-topics are ranked based on a sub-topic popularity score.

12. The method of claim 11, wherein the sub-topic popularity score is a measure of the popularity of the sub-topic based on sub-topic popularity factors.

13. The method of claim 12, wherein the sub-topic popularity factors include freshness, temporal burstiness, location affinity, contextual information, and average popularity.

14. The method of claim 8, wherein the plurality of cluster groups are ranked based on a cluster group popularity score.

15. The method of claim 14, wherein the cluster group popularity score is a measure of the popularity of the cluster group based on cluster group popularity factors.

16. The method of claim 15, wherein the cluster group popularity factors include freshness, temporal burstiness, location affinity, contextual information, and visible size of the cluster.

17. A method comprising:

receiving one or more characters of a partial query string;

generating a first plurality of candidate suggestions, wherein each candidate suggestions comprises a complete query term based on the received characters;

clustering the first plurality of candidate suggestions into a plurality of cluster groups;

wherein each cluster group of the plurality of cluster groups functions as a root node for candidate suggestions with a similarity score comprising a measure of similarity between candidate suggestions over a threshold value;

causing the display of cluster groups and sub-topics, wherein causing the display further comprises:

selecting, from the plurality of cluster groups, a first number of cluster groups based on a popularity score assigned to each cluster groups;

determining, for each cluster group of the first number of cluster groups, a respective cluster label based on the complete query terms of candidate suggestions within the cluster group;

determining, for a first cluster group of the selected first number of cluster groups, sub-topics to display;

determining, for each sub-topic to display a name based on the complete query term of a respective candidate suggestion in the first cluster group; and presenting the first number of cluster groups and sub-topics in an organized manner, wherein the cluster labels of the first number of cluster groups are presented vertically ranked by the popularity score assigned to each respective cluster group; and wherein the names of the sub-topics are presented horizontally, next to the name of the first cluster group, ranked by a popularity score assigned to each respective candidate suggestion;

selecting a cluster label or sub-topic;

determining a complete query term from a candidate suggestion associated with the selection;

performing a search using the determined complete query term;

returning the results of the search; and causing the display of the search results.

18. The method of claim 17, wherein the first plurality of candidate suggestions comprises a single character or a combination of characters representing the initial portion of a complete query term.

19. The method of claim 18, wherein a character comprises letters, numbers, symbols (e.g., @, &, %, $, etc.), punctuation, text modifiers (e.g., capitalization, italics, bold, underline, etc.), website addresses, search commands (e.g., Or, Site:, Related:, Info:, etc.), search operators (e.g., Cache, Allintext, Intext, Around( ), etc.), natural language spoken word, audio files, video files and/or images.

20. The method of claim 17, wherein similarity is measured by similarity measures such as semantic similarity using distributed embeddings (e.g., word2vec, BERT, GloVE, FastText, etc.), number of co-occurring sessions, number of commonly clicked webpages within a set threshold (e.g., top ranking within a geographic location or time period, etc.), similarity based on string edit distance, density-based similarity, distribution-based similarity, centroid-based similarity, and hierarchical-based similarity.

* * * * *